US012082633B2

(12) United States Patent
Russikoff

(10) Patent No.: US 12,082,633 B2
(45) Date of Patent: Sep. 10, 2024

(54) PROTECTIVE FACE MASK

(71) Applicants: RODAN ENTERPRISES, LLC, Doylestown, PA (US); Ronald K. Russikoff, Philadelphia, PA (US)

(72) Inventor: Ronald K. Russikoff, Philadelphia, PA (US)

(73) Assignee: RODAN ENTERPRISES, LLC, Doylestown, PA (US)

( * ) Notice: Subject to any disclaimer, the term of this patent is extended or adjusted under 35 U.S.C. 154(b) by 44 days.

(21) Appl. No.: 17/803,056

(22) PCT Filed: Sep. 15, 2020

(86) PCT No.: PCT/US2020/000037

§ 371 (c)(1),
(2) Date: Jan. 27, 2022

(87) PCT Pub. No.: WO2022/015278

PCT Pub. Date: Jan. 20, 2022

(65) Prior Publication Data

US 2023/0371624 A1 Nov. 23, 2023

(51) Int. Cl.

*A41D 13/11* (2006.01)
*A62B 18/02* (2006.01)
*A62B 18/08* (2006.01)

(52) U.S. Cl.

CPC .......... *A41D 13/113* (2013.01); *A62B 18/025* (2013.01); *A62B 18/084* (2013.01)

(58) Field of Classification Search

CPC .. A41D 13/11; A41D 13/113; A41D 13/1107; A62B 18/025; A62B 18/084; A62B 23/025; A62B 23/06

See application file for complete search history.

(56) References Cited

U.S. PATENT DOCUMENTS 1,562,302 A * 11/1925 Mansfield .......... A41D 13/1192 128/206.13
5,331,957 A * 7/1994 Liu ...................... A62B 23/025 128/206.17
11,064,745 B1 * 7/2021 Ahmed .............. A41D 13/1123
2003/0145858 A1 * 8/2003 Cardarelli ............... A61F 9/045 128/206.22

FOREIGN PATENT DOCUMENTS

WO WO-2022074410 A1 * 4/2022

* cited by examiner

*Primary Examiner* — Tarla R Patel
(74) *Attorney, Agent, or Firm* — Armand M. Vozzo, Jr.

(57) ABSTRACT

An improved protective face mask is disclosed having separate chambers for the nose and mouth thereby creating separate air passages for air flow and better circulation of clean air flow for breathing. The mask comprises a first chamber made to form and fit upon the nose of the wearer having a first air passage and a second chamber formed to cover and contain the mouth of the wearer having a second air passage for directing air flow therein. The mask includes a secured separation means between the first chamber and the second chamber, and an angled directional cavity in the second chamber extending downwards from mouth area towards chin area for creating the second air passage to direct the air flow.

19 Claims, 6 Drawing Sheets

PROTECTIVE FACE MASK

CROSS-REFERENCE TO RELATED APPLICATION

This application claims the benefit of U.S. Provisional Application Ser. No. 63/103,125 filed on Jul. 17, 2020 for Protective Face Mask.

BACKGROUND OF THE INVENTION

The present invention relates to face masks used to protect a wearer against exposure to airborne germs and pollutants, and more particularly, to an improved protective face mask configured and constructed with separate chambers and air passages therein to control air flow direction enabling the the wearer to breathe cleaner air while maintaining protection.

Masks are extremely useful for safeguarding users by ensuring protection against exposure to air pollutants in both low-risk and high-risk environments. Depending on the extremity of the conditions, these protective face masks are manufactured with multiple levels of safety provisions which in turn may lead to other issues such as difficulty in wearing the mask due to uncomfortable fit, a difficulty in breathing in case the masks are too tight or have a high level of filtration, or due to the weight of the mask in case of multiple layers of filtration. In high risk environments such as biological labs or hospitals treating patients with highly contagious diseases etc., there is frequent emission of sprays and aerosols carrying viruses and it requires N95 or P100 respirator masks for the healthcare and lab workers. In relatively low risk environments, the use of surgical masks, cloth masks, or dust masks is prevalent. Even though these low risk masks are constructed with different materials, they do not prevent exposure to unwanted particles efficiently. Surgical masks have filtering materials, but they do not generally provide form fitting to the facial structure leaving gaps for germs to potentially enter the nose and mouth. Cloth masks recommended by governmental health agencies like the Center for Disease Control do not have the finer material weave to filter out viruses and dust masks are structured to protect against larger particles. Examples of some of the prior art masks include Neil (U.S. Pat. No. 4,419,993), Shogo Nagao (U.S. Pat. No. 9,386,813), and Victoria (U.S. Pat. No. 8,695,603). While these and other prior art masks have performed effectively in their specific applications of filtration, form fitting etc., their structure has operational limitations, particularly with respect to providing efficient air flow and clean air for breathing.

During the course of a severe health emergency, such as during a viral pandemic, all citizens and resident persons of a country may be mandated to wear these protective face masks for longer periods and on a daily basis in public until the virus is suppressed, and a vaccine is developed. However, wearing a mask for long durations can lead to health issues if the masks are not designed appropriately to enable the wearer to have sufficient clean air for breathing. The health issues can vary from headaches, to increased airway resistance, carbon dioxide accumulation, and oxygen level deficiencies that can lead to serious life-threatening complications. Moreover, people predisposed with breathing difficulties or pre-existing health conditions may be adversely affected by wearing these masks due to the insufficient air exchange that may occur while wearing these face masks for prolonger periods of time. Even though the prior art masks are designed as a barrier to protect the wearer, they also tend to alter his or her normal air exchange, covering the lower face of the wearer and restricting his or her ability to inhale clean oxygen and exhale carbon dioxide due to common air passage. In the typical flexible surgical mask of today, this bather forms a unitized chamber and forces the wearer to breathe in more carbon dioxide when inhaling as it is collected and trapped within the unitized chamber between the mask and the face with each exhale and inhale. In addition, coughing is a way in which our body gets rid of foreign particles, mucus and bacteria. Coughing, by forcing air out of the lungs under high pressure, attempts to clear the throat from these foreign particles. With the prior art masks, the risk of again inhaling such particles immediately after coughing is very high.

Therefore, a need exists for a new and improved protective mask that will provide safe and effective means to protect a wearer during prolonged use over extended periods of time.

SUMMARY OF THE INVENTION

Accordingly, it is a general purpose and object of the present invention to provide an improved protective mask capable of providing the wearer with an effective barrier against air pollutants and germs while enabling the wearer to better breathe clean air during prolonged periods of usage.

A more particular object of the present invention is to provide an improved protective face mask configured and constructed with separate chambers and air passages to control air flow direction that will enable the wearer to better breathe air over extended periods of use while maintaining barrier protection against exposure to germs and pollutants.

Another object of the present invention is to provide a protective face mask that affords the wearer with safer directional air flow during the normal process of breathing while the mask is worn, especially during prolonged periods of usage.

Still another object of the present invention is to provide an improved protective mask construction that is separately chambered with air flow direction control for safer use and capable of fitted adjustments for any type of facial contours of the user, reducing gaps between face and the mask as it is worn that can reduce fogging of eyeglasses worn by the user.

A still further object of the present invention is to provide an improved protective face mask that is safe and easy to wear for long durations and that is relatively inexpensive to construct and manufacture on a large scale.

Briefly, these and other objects of the present invention are accomplished by a protective face mask constructed generally of flexible cloth material having separate chambers formed for the nose and mouth thereby creating separate air passages for the flow of breathing air. The present protective face mask comprises a first chamber, intended as the nasal chamber, having a first air passage and a second chamber, intended as the oral chamber, having a second air passage for directing air flow therein. The mask includes a secured means of separation between the nasal chamber and the second chamber for separating the air flow of the respective chambers, and an angled directional cavity formed in a protruding section of the oral chamber extending downwards from the area of the mouth and towards the chin for creating the second air passage to direct the air flow. The nasal chamber is constructed having two side panels with a channel formed therebetween to secure the nose and its cartilages within the chamber and create the first air passage. The nasal chamber includes a top seam disposed around the bridge of the nose, a bottom seam disposed along the base of the nose juxtaposed with the secured separation means, and a vertical front seam between the top seam and the bottom seam joining the two sides of the nasal chamber at a nose tip. The nasal chamber further comprises at least one elastic means on each side of the nasal chamber to secure the position thereof upon the nose of the wearer such that the chamber may flex and conform to face contours of the wearer. The oral chamber includes two side walls extending from either side to join in the center to form the protruding section and the angled direction cavity extending downwardly and outwardly from the area of the wearer's mouth. The mask fits substantially flush against the nose, cheeks and chin of the wearer and is held in place with elastic string or band elements connected at opposite sides of the mask and formed to loop around the ears of the wearer.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DESCRIPTION OF THE INVENTION

Figure 1:
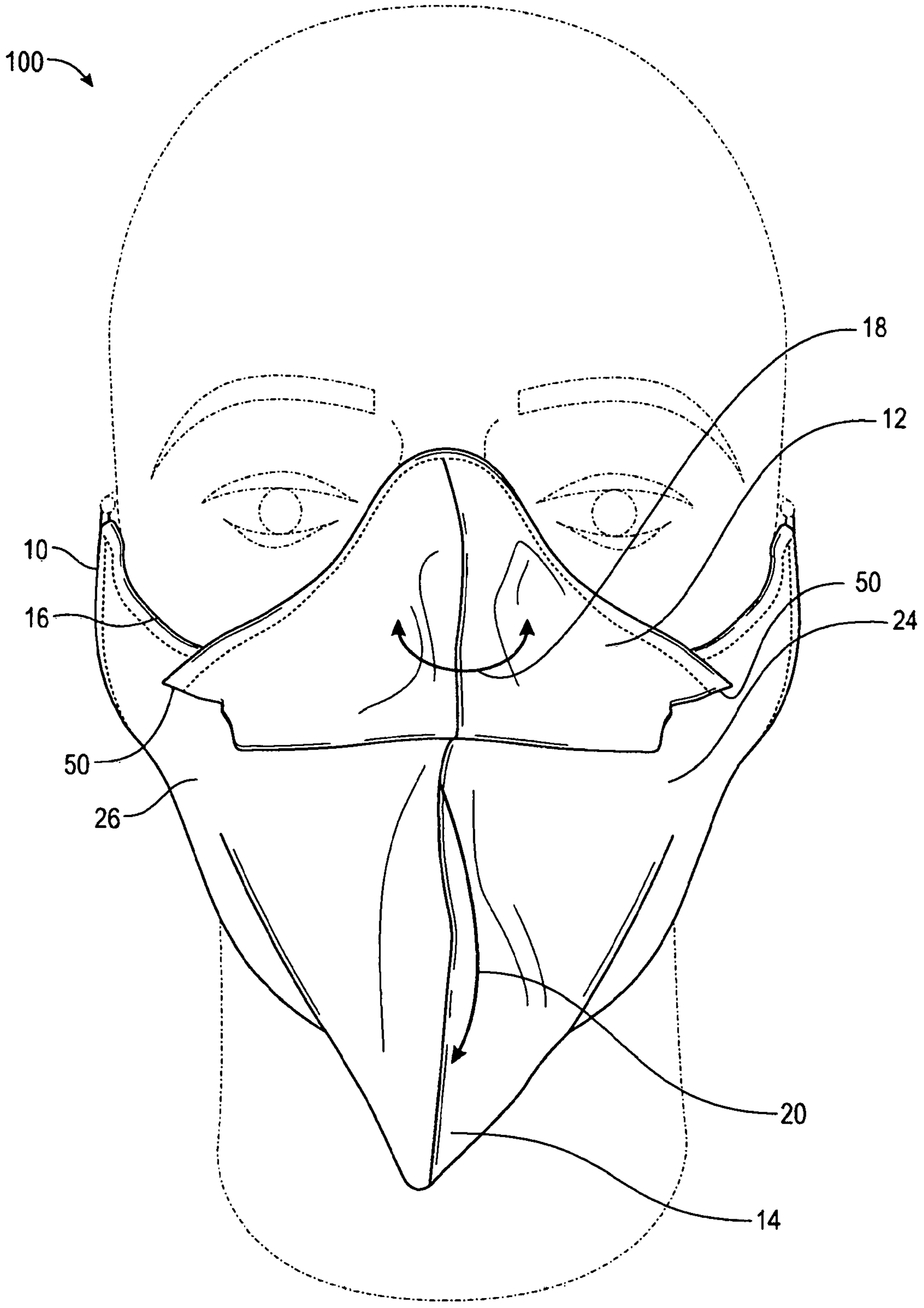
FIG. 1 is a frontal perspective view of a protective face mask shown on a wearer and made according to the present invention.

The following serves to describe a preferred embodiment of the present invention and the best presently contemplated mode of its production and practice. This description is further made for the purpose of illustrating the general principles of the invention but should not be taken in a limiting sense, the scope of the invention being best determined by reference to any associated claims.

Referring to the drawings, the following is a list of elements/parts/components of the mask, generally designated 10, and those associated structural elements shown employed in connection with the present invention:

100 mask worn by a wearer;
10 protective face mask;
12 first (nasal) chamber;
14 second (oral) chamber;
16 secured separation seam;
18 first air passage;
20 second air passage;
22 angled directional cavity;
24 left side wall of oral chamber;
26 right side wall of oral chamber;
28 protruded section of oral chamber;
30 left side panel of the nasal chamber;
32 right side panel of the nasal chamber;
34 channel along nasal chamber;
36 top seam of nasal chamber;
38 vertical seam of nasal chamber;
40/42 pair of elastic string members;
44 first elastic band member;
46 second elastic band member;
48 wire member; and
50 exhaust outlets.

Figure 2:
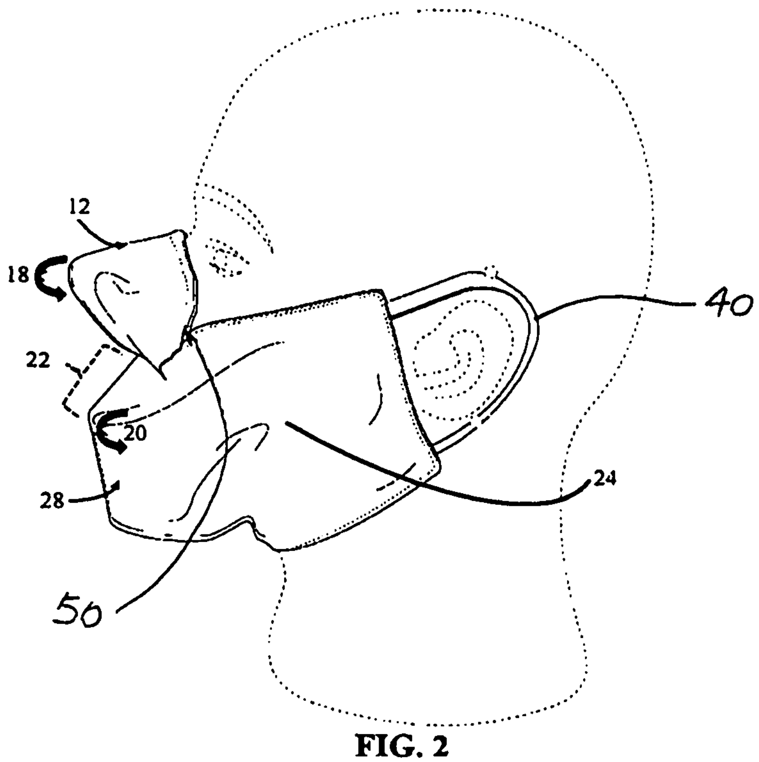
FIG. 2 is a side prospective view of the face mask shown in FIG. 1 and as secured in position upon the wearer.

Referring now to the drawings and initially to FIGS. 1 and 2, the protective face mask 10 of the present invention is shown worn by the wearer 100 as a protection device. The face mask 10 is generally made of flexible cloth material and comprises a first chamber 12 and a second chamber 14 separated by a reinforced seam 16 or other secured means of connection made along the interface between them. The first chamber 12 is the nasal chamber and the second chamber 14 is the oral chamber. The two-chamber configuration enables separation of air passages of the nasal chamber and oral chamber of the mask with a first air passage 18 being formed for the nasal airway of the wearer and a second air passage 20 formed for the oral airway. The present protective mask 10 is intended to fit over and substantially abut against the nose, cheeks and chin of the wearer and is held in place with a pair of elastic string or band elements 40 and 42 connected at opposite sides of the mask and configured to loop around the ears of the wearer.

The second chamber 14 includes a protruding section 28 wherein an angled directional cavity 22 is formed extending downwards from the area of the mouth of the wearer towards the chin for creating the second air passage 20 to direct the air flow in the second chamber. The second chamber 14 includes a left side wall 24 and a right side wall 26 each extending from either side to join together and form the protruding section 28 and the angled direction cavity 22 contained therein extending downwardly and outwardly from the area of the wearer's mouth. In this formation within the protruded section 28 of the second chamber 14, the angled direction cavity 22 provides space for air to flow in a directed fashion away from the mouth space through the second air passage 20. The second air passage 20 directs airflow away from the mouth opening and towards the chin area through the outwardly protruded structure 28. The protruded structure 28 with its specially configured angled cavity 22 thus serves as a flexible pouch formed upon the second chamber 14 and positioned centrally therein so that it may be vented to receive air flow from the mouth of the wearer into the air passage 20. The angled cavity 22 of the second chamber 14 within the protruded structure 28 is sized and shaped to span laterally the area immediately beneath the cheeks of the wearer on both sides, and extend downward from the area just benath the nose (Philtrum) and over the mouth and chin of the wearer. The angled cavity 22 of the second chamber 14 and the air passage 20 established thereby provides directional air flow within the second chamber 14 and away from the first chamber 12 enabling breathing of clean air by the wearer and not intake of exhausted air.

Figure 3:
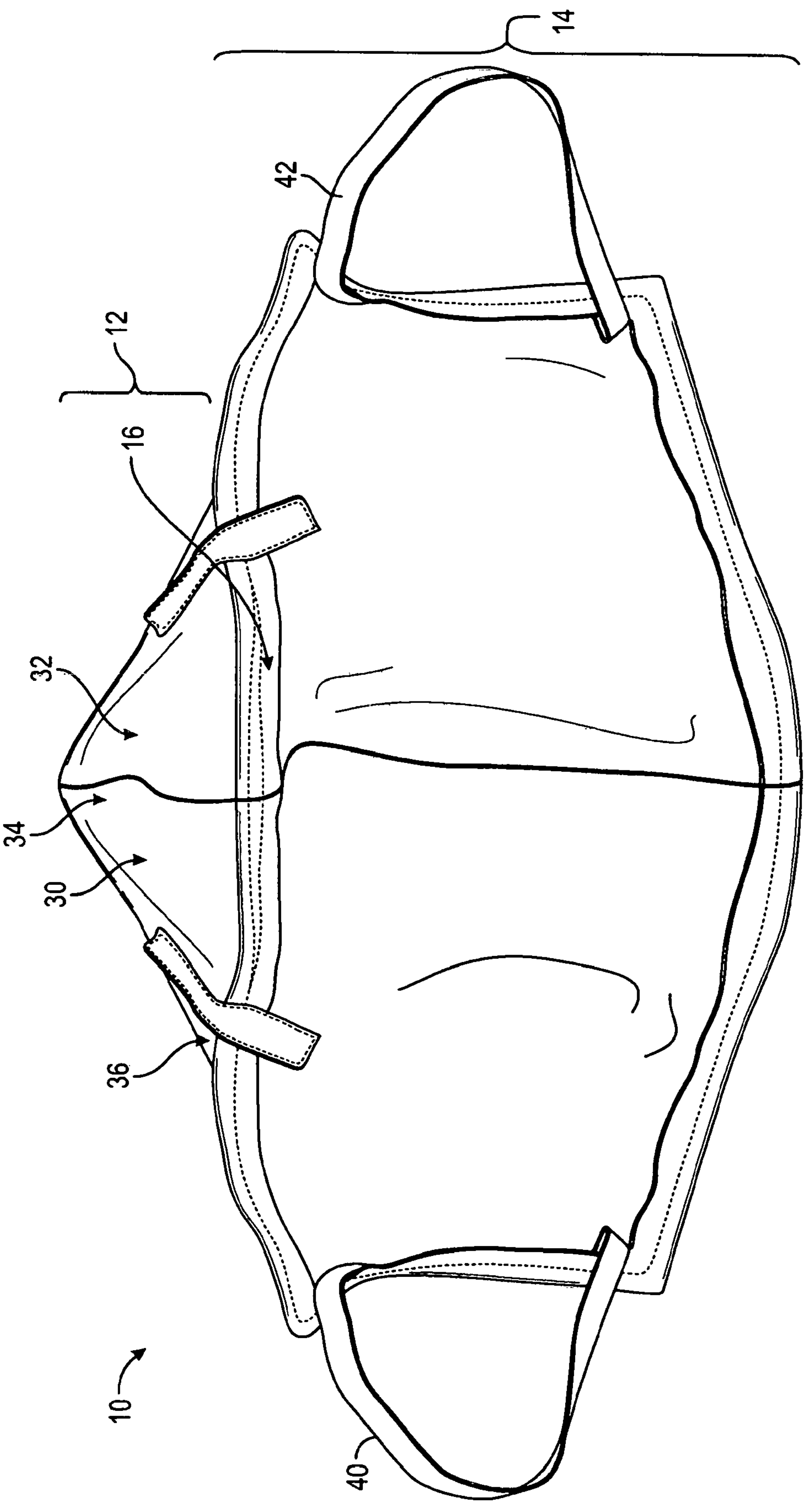
FIG. 3 is a layout view of the inside of the present protective face mask of FIGS. 1 and 2 shown apart from the wearer.
Figure 4:
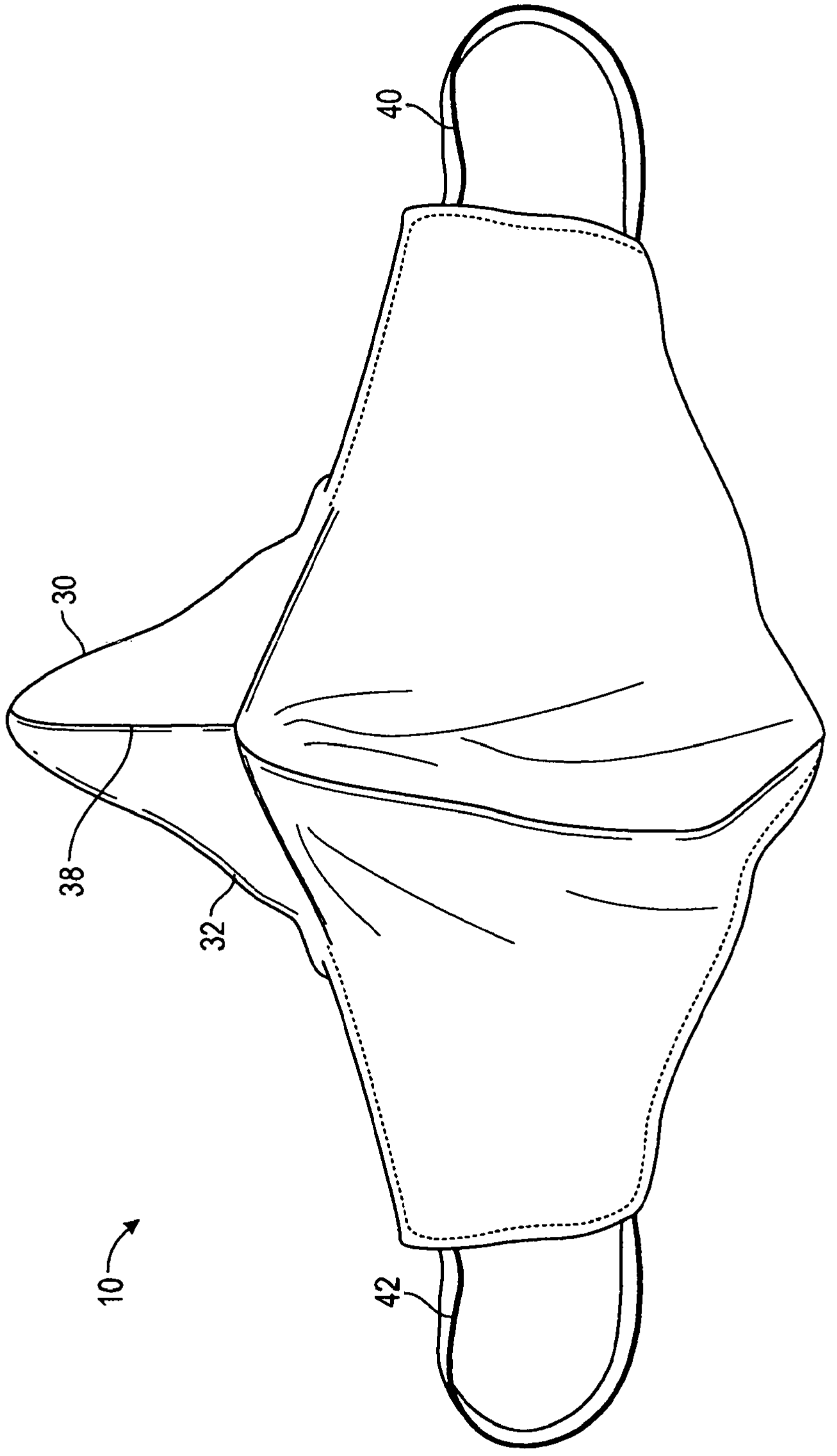
FIG. 4 is a layout view of the outside of the present protective face mask shown in FIGS. 1 and 2 apart from the wearer.

Referring now to FIGS. 3 and 4, the first chamber 12 is formed comprising two surface panels, one being a left side panel 30 and the other, a right side panel 32 joined together along a seamed interface and configured having a channel 34 formed within the orifice of the chamber 12 adapted to contain the tip of the nose of the wearer and secure the cartilages thereof. The channel 34 formed between the respective left side and right side panels 30 and 32 and the cavity formed thereby establishes the first air passage 18 in the first chamber 12 to provide enhanced air exchange. The channel 34 extending towards the nose tip creates a cavity in the first chamber 12 such that the first chamber 12 is shaped and dimensioned to cover the lower portion of the sides, bridge and the tip of the nose. The first chamber 12 includes a top seam 36 around the edge intended to abut the bridge of the nose, a bottom seam 37 along the base edge juxtaposed with the secured separation means 16 at the base of the nose, and a vertical front seam 38 between the top seam 36 and the bottom seam 37 joining the two side panels 30, 32 of the first chamber in the area intended to cover the nose tip. A pair of narrow exhaust outlets 50 are preferably maintained at the base of the first chamber 12 on each side and are vented to the outside and onto the exterior surface of the second chamber 14. As such, these exhaust outlets 50 may be fitted and inserted with an air filtration element (not shown), such as a commercially available nasal screen.

Figure 5:
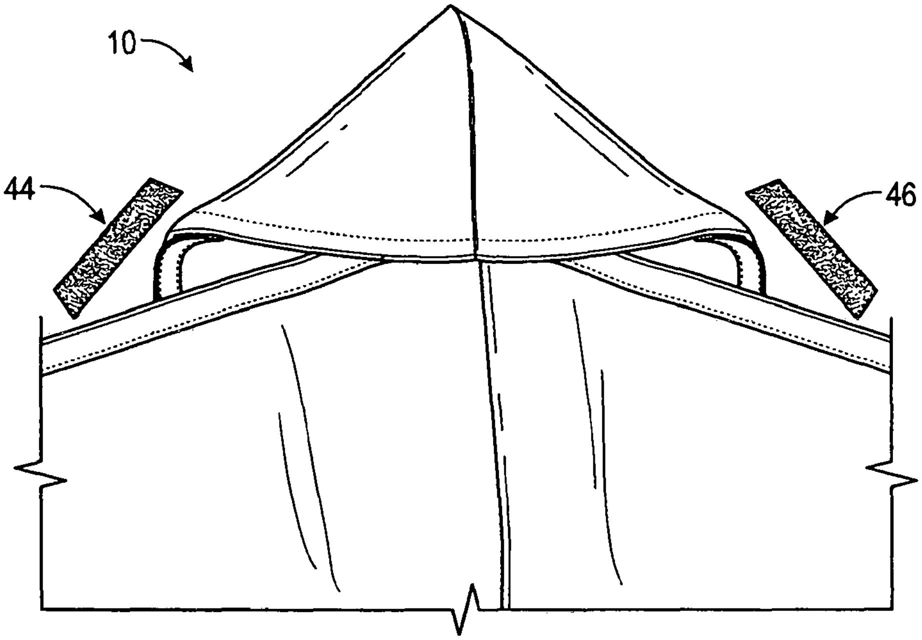
FIG. 5 is an enlarged view of the protective face mask as shown in FIG. 4 along the interface of the separate chambers and with the elastic means used on either side of the upper chamber to form fit the mask on a wearer being broken out.
Figure 6:
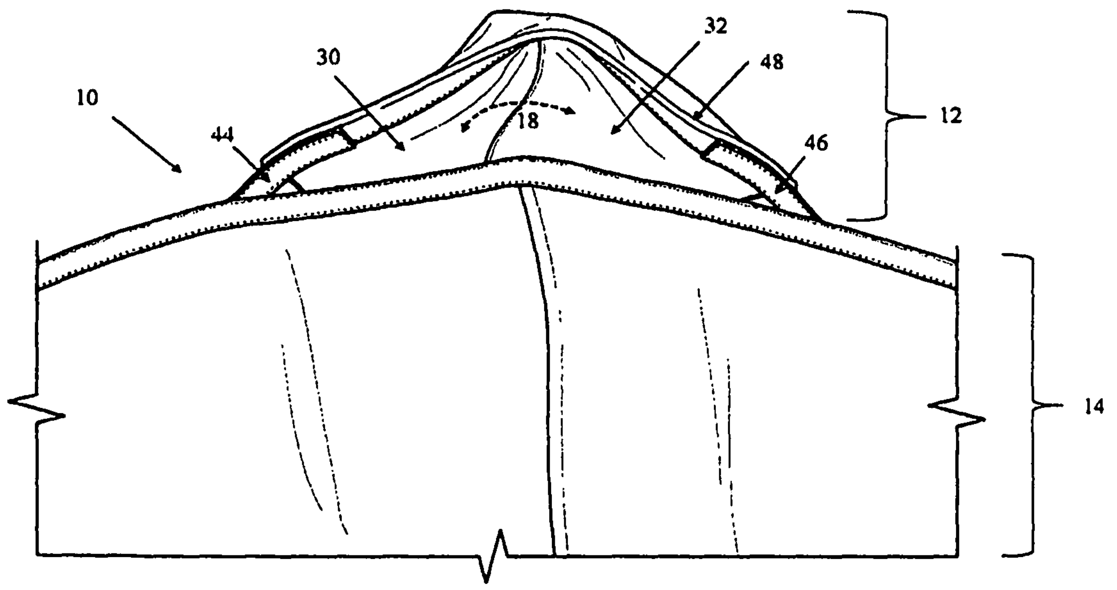
FIG. 6 is an enlarged view of the protective face mask from the inside thereof as shown in FIG. 3 with a wire element sewed inside the upper chamber of the mask according to the present invention.

Referring now to FIGS. 5 and 6 in conjunction with the foregoing FIGS. 1-4, the first chamber 12 includes a first elastic means 44 on left side panel 30 and a second elastic means 46 on right side panel 32 to secure the mask 10 onto the wearer and allow the first chamber to flex and conform to face contours of the wearer. The elastic means 44 and 46 when secured in place on the respective side panels 30 and 32, eliminate gaps upon covering the nose of the wearer and provide tension on either side and the base of the nose and cheeks enabling a secure fit for any face contours such that air exhalation from the nose moves substantially through the first air passage 18. The first chamber 12 further includes a wire member 48 configured to shape the first chamber 12 around the bridge of the nose in a V-shape to eliminate gaps and provide a secure fit when the mask is worn. The wire member 48 in this configuration enables better form-fitting of the mask 10 to the facial structure of the nose and substantially close any gaps around the bridge of the nose and the air flow therethrough thereby reducing if not eliminating fogging of eyewear. The wire member 48 is made of a relatively thick gauge stock, about 19 gauge in size, of metal wire sewn into the first chamber 12 of the mask 10 along the top of its orifice to shape the mask closely around the nose, with the relatively thicker wire maintaining the shape and close fit. The length of the wire is relatively short, about 2 inches, to reduce bending of the wire and deformation of its V-shape due to up and down movement of the mask 10. The V-shape formation of the wire member 48 provides a better fit and eliminates gaps no matter what position the mask 10 moves into upon the nose. With the gaps eliminated from around the perimeter fit of the first chamber 12, the present protective mask 10 provides directional airflow from the nose to exhaust outlets 50 provided at the base of the first chamber on either side that are vented to the outside and exterior of the second chamber 14.

In an exemplary embodiment, the protective face mask 10 of the present invention may include filtering means placed inside the first chamber or the second chamber or both for filtering pollutants from air entering the first and second chamber. The filtering means may be an air filter or anti-bacterial layer placed inside the first and/or the second chamber or any other anti-virus or anti-bacterial component configured for enhancing filtering of pollutants including bacteria and virus. The filteration layer may be a replacable filter component that may be replaced periodically to enable repeated use of the mask for a longer duration. Alternately, the filteration layer may be an integrated filter inside the first or second chamber imparting anti-bacterial properties to surface of the chamber itself.

In alternate embodiments, the present protective face mask 10 may be constructed from any flexible material like fibre material, flexible elastomeric material, etc., that is hypo-allergenic, and may be connected and assembled in its component parts by sewing, cloth molding or even plastic moulding. Non-limiting examples of the fibrous material are cellulosic fiber, mineral fibers, nylon fiber, acrylonitrile fiber, wool or other natural organic fibers, polyester fiber, and the like. In further embodiments of the present invention, protective face mask 10 may be formed from semi-rigid and more rigid materials, such as various types of plastics and may be manufactured by moulding with removable or integrated filters made of fibrous electrostatic polypropylene material. In order to maintain the directionally controlled air flow in the first and second chambers, 12 and 14, respectively, that enhances the wearer's breathing of clean air during extended usage of the present mask 10, the separation means 16 for the mask manufactured with the semi-rigid or more rigid materials will be generally flexible to enable a secure fit.

Therefore, it is apparent that the described invention provides an improved protective face mask capable of providing the wearer with an effective barrier against air pollutants and germs while enabling the wearer to better breathe clean air during prolonged periods of usage through utilization of the two-chamber construction separated by a secured separation means thereby creating an air passage for each of the chambers to ensure better circulation of clean air flow for breathing. The separately chambered construction of the present protective face mask affords the wearer with safer directional air flow during the normal process of breathing all the while the mask is worn, especially beneficial during prolonged periods of usage. The present protective face mask and its two-chamber construction is further enhanced by the protruded structure formation in the oral chamber containing the angularly directional cavity providing additional space for air flow through the second air passage. In addition, the described invention provides an improved protective face mask that is capable of fitted adjustments for any type of facial contours of the user and may be easily adjusted in its fit. The foregoing protective face mask is also safe and reliable, comfortable to wear, and relatively inexpensive to construct and manufacture on any scale.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. Furthermore, certain modifications to the described embodiment that serve to benefit its usage are within the scope of the present invention. Accordingly, it is understood that this invention is not limited to the particular embodiment described, but rather is intended to cover modifications within the spirit and scope of the present invention.

What is claimed:

1. A protective mask for covering areas of a nose, a mouth and a chin of a user, comprising:

a first chamber for covering the nose and having a first air passage for breathing through the nose, said first chamber being constructed having two surface panels joined together along a seamed interface with a nasal channel formed therebetween within said first chamber to contain a tip of the nose and the cartilages thereof to create the first air passage, and wherein said first chamber further comprises: a top seam around a bridge of the nose; a bottom seam at a base of the nose; and a vertical front seam between the top seam and the bottom seam joining the two surface panels of said first chamber at a tip of the nose;

a second chamber formed separate from said first chamber and disposed contiguous therewith along a common interface therebetween for covering the mouth and having a second air passage for breathing through the mouth, the second chamber being connected integrally to the first chamber along the common interface so that the respective chambers are isolated from each other; and a secured separation means for integrally connecting said first and second chambers along the common interface therebetween such that separate and isolated air flow is maintained in the first and second air passages.

2. The protective mask of claim 1, wherein said second chamber is constructed having an angled directional cavity formed therein, the angled directional cavity being formed to extend outward and downwards from the mouth towards the area of the chin for directing air flow within the second air passage.

3. The protective mask of claim 2, wherein the second chamber includes a protruding section wherein the angled directional cavity is formed, the protruding section having side walls extending forwardly together about the mouth area of the user so that the angled directional cavity extends downwards and outwardly away from the mouth area and toward the chin to provide the second air passage.

4. The protective mask of claim 3, wherein the second air passage directs airflow away from the mouth area towards the chin area through the outwardly extended cavity.

5. The protective mask of claim 4, wherein the angled directional cavity of said second chamber formed within the protruded structure is shaped and dimensioned to span an area immediately beneath the cheeks of the wearer on both sides and extend downward from an area just beneath the nose and over the mouth and chin of the user.

6. The protective mask of claim 5, further comprising filtering means placed inside said second chamber for filtering pollutants from air entering said second chamber.

7. The protective mask of claim 1, further comprising at least one elastic band member connected on each side of the surface panels of said first chamber to secure position of the protective mask upon the user such that said first chamber flexes and conforms to face contours of the user.

8. The protective mask of claim 1, wherein said first chamber further comprises at least one wire configured to shape said first chamber around the tip of the nose in a V-shape to eliminate gaps and provide a secure fit.

9. The protective mask of claim 1, wherein the nasal channel extending towards the nose tip creates a cavity in said first chamber such that said first chamber is shaped and dimensioned to cover lower portion of the sides, bridge and tip of the nose.

10. The protective mask of claim 1, wherein at least one exhaust outlet is provided at the base of said first chamber and fitted with a filtration member.

11. The protective mask of claim 1, further comprising elastic means for holding the mask in place upon the face of the user and in position across the nose, mouth, cheeks and chin.

12. The protective mask of claim 1, wherein the mask is formed from flexible material of the type selected from fibre material, flexible elastomeric material, and like fabric materials.

13. A protective mask for covering areas of a nose, a mouth and a chin of a user, comprising:

a first chamber for covering the nose and having a first air passage for breathing through the nose, said first chamber being constructed having two surface panels joined together along a seamed interface with a nasal channel formed therebetween within said first chamber to contain a tip of the nose and the cartilages thereof to create the first air passage;

a second chamber formed separate from said first chamber and disposed contiguous therewith along a common interface therebetween for covering the mouth and having a second air passage for breathing through the mouth, the second chamber being connected integrally to the first chamber along the common interface so that the respective chambers are isolated from each other, said second chamber further constructed to include a protruding section having an angled directional cavity formed therein and made to extend outwards and downwards from the mouth towards the area of the chin for directing air flow within the second air passage, the protruding section having side walls extending forwardly together about the mouth of the user so that the angled directional cavity extends downwards and outwardly away from the mouth and toward the chin to provide the second air passage thereby directing airflow away from the mouth towards the chin area through the angled directional cavity; and a secured separation means for integrally connecting said first and second chambers along the common interface therebetween such that separate and isolated air flow is maintained in the first and second air passages.

14. The protective mask of claim 13, wherein the angled directional cavity of said second chamber formed within the protruding section is shaped and dimensioned to span the area immediately beneath the cheeks of the user on both sides and extend downward from the area just beneath the nose and over the mouth and chin of the user.

15. The protective mask of claim 14, wherein the mask is formed from flexible material of the type selected from fibre material, flexible elastomeric material, and like fabric materials.

16. The protective mask of claim 13, further comprising at least one elastic band member connected on each side of the surface panels of said first chamber to secure position of the mask upon the user such that said first chamber flexes and conforms to face contours of the user.

17. The protective mask of claim 16, further comprising elastic means for holding the mask in place upon the face of the user and in position across the nose, mouth, cheeks and chin.

18. A protective mask for covering areas of a nose, a mouth and a chin of a user, comprising:

a first chamber formed for covering the nose and having a first air passage contained therein for breathing through the nose, said first chamber being constructed having two surface panels joined together along a seamed interface with a nasal channel formed therebetween within said first chamber to contain a tip of the nose and the cartilages thereof to create the first air passage;

a second chamber formed separate from said first chamber and disposed contiguous therewith along a common interface therebetween for covering the mouth and having a second air passage to direct air flow therethrough for breathing through the mouth, the second chamber being connected integrally to the first chamber along the common interface so that the respective chambers are isolated from each other, the second chamber including a protruding section formed therein to provide an angled directional cavity extending outwards and downwards from the mouth towards the chin of the user for directing air flow within the second air passage; and a secured separation means for integrally connecting said first and second chambers along the common interface such that separate and isolated air flow is maintained in the first and second air passages.

19. The protective mask of claim 18, wherein said secured separation means comprises one of more reinforced seams stitched along the common interface between the first and second chambers.

* * * * *